United States Patent [19]

Bataille

[11] Patent Number: 4,804,733

[45] Date of Patent: Feb. 14, 1989

[54] THERMOSHRINKABLE TUBE MEANS FOR CONTROLLING UNIFORM HEATING THEREOF AND PROCESS FOR FABRICATING SUCH TUBE

[75] Inventor: Claude Bataille, Nogent-sur-Marne, France

[73] Assignee: Treficable Pirelli, Saint Maurice, France

[21] Appl. No.: 69,646

[22] Filed: Jul. 6, 1987

[30] Foreign Application Priority Data

Jul. 10, 1986 [FR] France ................................. 86 10057

[51] Int. Cl.$^4$ ......................... F16L 11/04; B29L 41/00
[52] U.S. Cl. ................................... 428/34.9; 138/177; 174/DIG. 8; 264/230; 264/296; 264/322; 428/212; 428/35.1
[58] Field of Search .................... 174/DIG. 8; 428/36, 428/212; 264/230, 342 R, DIG. 71, 322, 296; 138/177

[56] References Cited

U.S. PATENT DOCUMENTS 4,554,199 11/1985 Roentgen et al. .................. 264/230
4,569,868 2/1986 DeBlauwe et al. .......... 174/DIG. 8

FOREIGN PATENT DOCUMENTS 2133639 7/1984 United Kingdom .

*Primary Examiner*—Thurman K. Page
*Assistant Examiner*—James J. Seidleck
*Attorney, Agent, or Firm*—Brooks Haidt Haffner & Delahunty

[57] ABSTRACT

A heat shrinkable plastic sleeve having an inner surface deformed in circumferentially spaced portions by unequal amounts from its normal heat stable or unstable configuration so as to provide different stresses in the circumferential direction whereby uniformity of heating of the sleeve throughout its thickness can be observed during heat shrinking by observing the shrinkage of the sleeve at its ends. Also, a method of making such sleeve in which a sleeve of heat shrinkable material is placed on a mandrel having expandable fingers, the sleeve is heated and the fingers are radially expanded and the sleeve is cooled to provide the desired sleeve.

10 Claims, 2 Drawing Sheets

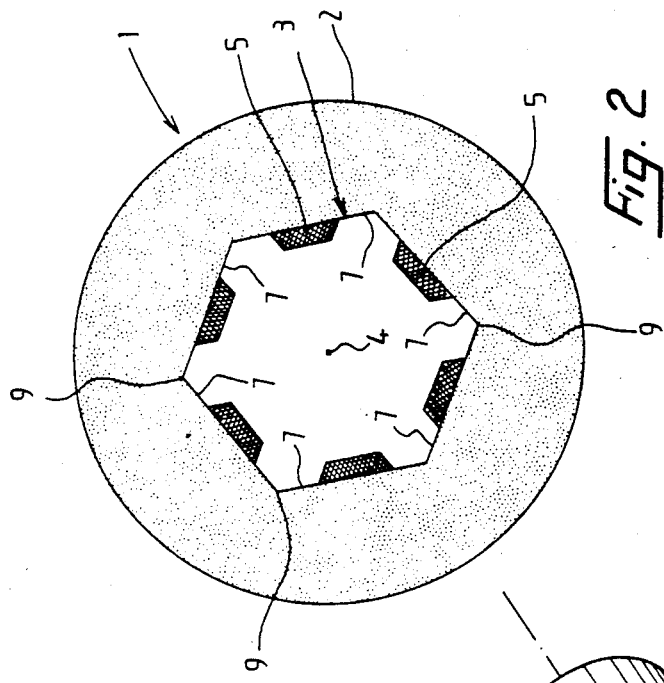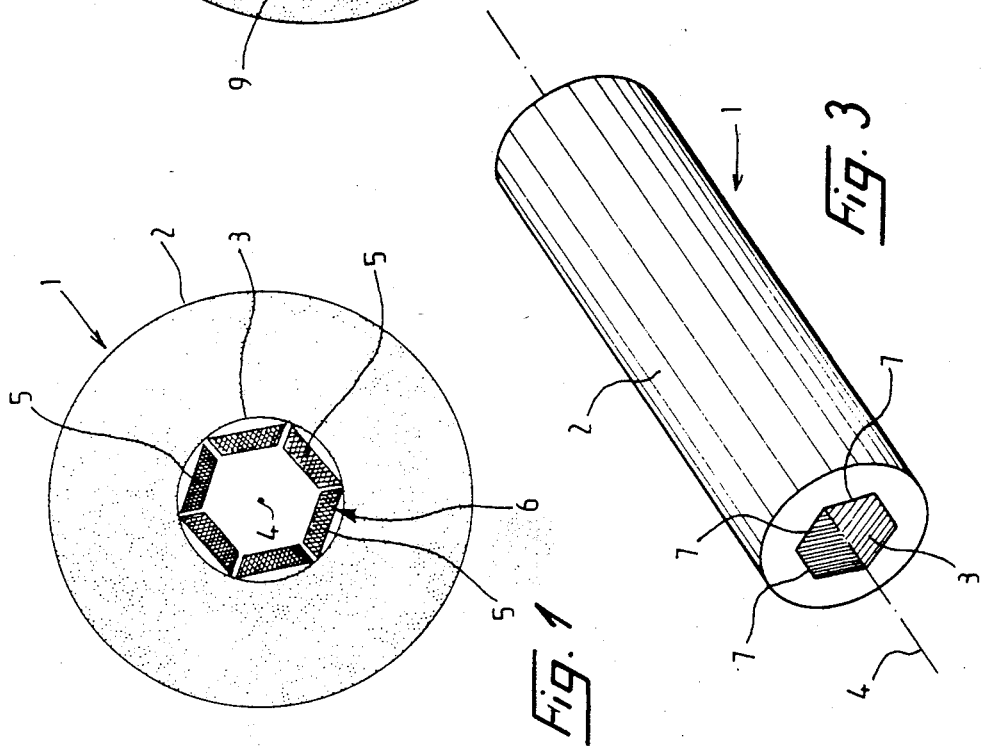

THERMOSHRINKABLE TUBE MEANS FOR CONTROLLING UNIFORM HEATING THEREOF AND PROCESS FOR FABRICATING SUCH TUBE

BACKGROUND OF THE INVENTION

The present invention relates to a heat-shrinkable sleeve intended to be applied on an object to be covered, defined by an inner surface and an outer surface and comprising means for controlling the uniform heating thereof.

One of the problems raised by the application of a heat-shrinkable sleeve onto an object is that of the feeding of heat to the sleeve. In particular, in the event that the sleeve is of substantial thickness, it is difficult to heat it uniformly throughout its entire thickness and over its entire length without the risk of locally burning the sleeve as a result of an excessive application of heat.

In order to guide the operator in effecting the heating of the sleeve it is known to provide marks in a colored material on the outer surface of the sleeve, the color of the marks changing when the sleeve has reached a predetermined temperature, thereby serving as a guide for the operator.

Such marks effectively facilitate the effecting of the heating of the sleeve, particularly when the sleeve is of slight thickness. However, when the sleeve is of substantial thickness, these marks are not fully satisfactory. In fact, as these marks are arranged on the outer surface of the sleeve they can give a precise indication of temperature only for a portion of the sleeve close to said outer surface, while the temperature of a portion furthest to the inside of the sleeve is not determined accurately.

BRIEF SUMMARY OF THE INVENTION

The object of the present invention is to propose a heat-shrinkable sleeve which has means for precisely controlling its uniform heating throughout its entire thickness.

For this purpose the invention concerns a heat-shrinkable sleeve intended to be applied onto an article to be covered and defined by an inner surface and an outer surface, characterized by the fact that it has at least two distinct regions on its inner surface between which there is a stress gradient.

Said stress is advantageously an expansion stress.

According to a preferred embodiment of the invention, the inner surface has a polygonal shape and cross section and comprises edge regions which alternate with flat regions, the said stress gradient increasing from the flat regions towards the edge regions.

The invention also concerns a method of manufacturing this heat-shrinkable sleeve which consists in producing a sleeve from a material or compound which can be imparted heat shrinkability and the inner surface of which has no stress gradient, in heating the sleeve, radially expanding the heated sleeve and cooling the sleeve so as to maintain it in its expanded condition, characterized by the fact that it consists furthermore in non-uniformly deforming the inner surface of the sleeve while the sleeve is heated in order to produce said stress gradient.

The inner surface of the sleeve advantageously is of circular shape in cross section before the expansion and deformation, and this inner surface is deformed to impart it a polygonal shape.

BRIEF DESCRIPTION OF THE DRAWINGS

Other details and advantages of the invention will become evident during the course of the following description of the preferred embodiment of the invention, read with reference to the accompanying drawings, in which:

FIGS. 1 and 2 are two front views of a sleeve, one before expansion and the other during expansion.

FIGS. 3 and 4 are two views of the expanded sleeve, one in perspective and the other in front view.

DETAILED DESCRIPTION OF THE INVENTION

Figure 5:
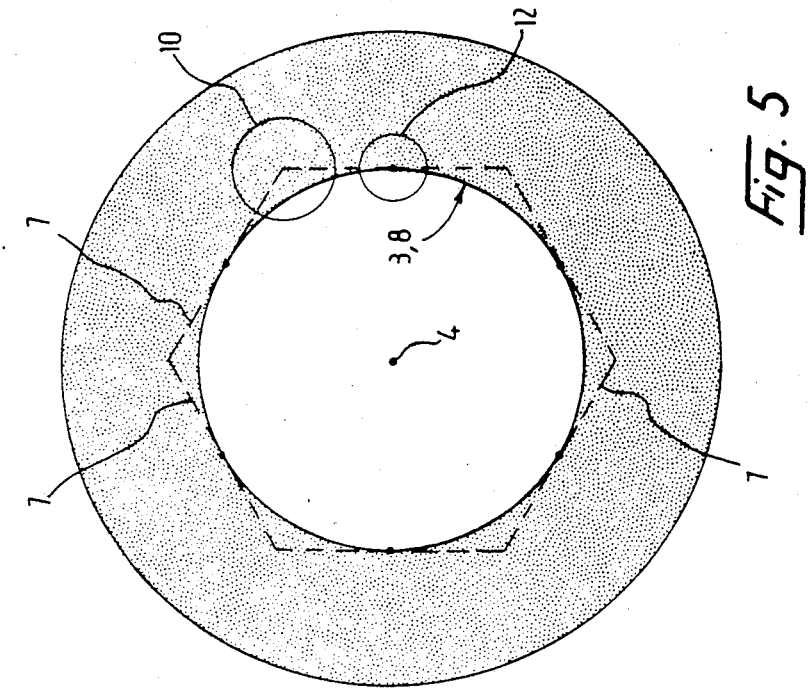
FIG. 5 is a front view of the sleeve during an intermediate heating phase.

The sleeve 1, shown in FIG. 1, is defined by two circular cylindrical surfaces having a common axis 4, namely an outer surface 2 and an inner surface 3. The sleeve is bounded axially by two planes perpendicular to the axis 4.

This sleeve is formed of an intimate mixture of an elastomeric material and a thermoplastic material. It is produced, for instance, by extrusion molding.

This sleeve is placed over an expansion mandrel comprising six fingers 5, only the latter being shown, which extend along the axis 4 of the sleeve 1 and are distributed around said axis, each finger having a flat surface 6 facing the inner surface of the sleeve and intended to cooperate with it. The mandrel comprises, in known manner, means for moving the six fingers 5 simultaneously in radial direction.

The sleeve is then heated, for example by placing it and the mandrel into a stove so as to cause the melting of the thermoplastic material distributed in the sleeve. The sleeve is then expanded radially by moving the fingers 5 of the mandrel apart, utilizing the deformability of the elastomeric material (FIG. 2).

At the end of the operation of the expansion of the sleeve, the latter is cooled so that the thermoplastic material solidifies and prevents the elastomeric material from resuming its original unexpanded shape. The sleeve is then withdrawn from the mandrel and stored.

Figure 4:
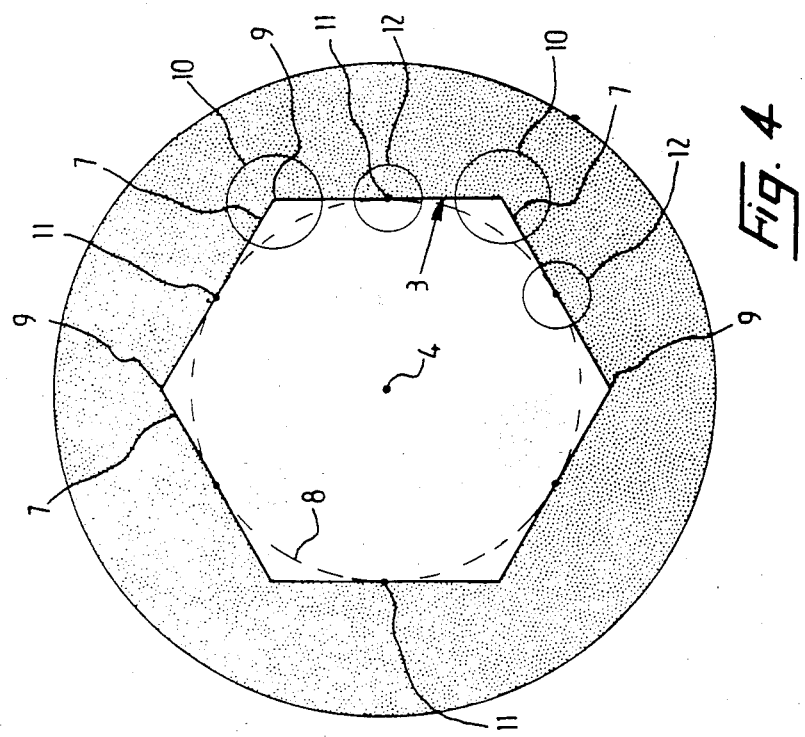

The sleeve which has been expanded in this way is shown in FIGS. 3 and 4. The outer surface 2 of the sleeve has increased in diameter and the inner surface 3 has been deformed in non-uniform manner around the axis 4 and has six flats 7, each extending along the axis 4 of the sleeve and distributed around the latter; the inner surface 3 therefore has a hexagonal shape, as seen in the front view of FIG. 4. Six edges 9 extend parallel to the axis 4 of the sleeve, each being formed at the juncture between two adjacent flats.

It will be noted that the resultant width of each flat is greater than the width of the flat surface 6 of the fingers 5 of the mandrel (FIG. 2): stated differently, it was not necessary to support the inner surface of the sleeve in each edge region 10 between two adjacent flats 7 in order to cause this expansion.

FIG. 4 shows in dashed line a circle 8 which is tangent to the six flats 7 of the hexagonal shape at a center point 11 of said flats, the center of the circle being located on the axis 4 of the sleeve. Regions 12 of tangency to the circle 8 can thus be defined, they constituting the aforementioned flat regions.

The six edges 9 are therefore situated radially to the outside of the circle 8. If one bears in mind that, before expansion, the inner surface 3 was circular, it will be understood that the edge regions 10 of the sleeve had to be expanded more than the tangency regions 12, so as to be pushed back radially beyond the circle 8. The edge regions 10 are therefore the seat of stronger expansion stresses of the elastomeric material than the tangency regions 12.

In use, the expanded sleeve is placed on an article to be covered, for instance a junction between two electric cables, which must be of a radial size such that it can be housed within the inside of the sleeve.

In the case of a junction, the sleeve is heated by an operator at the place of the laying of the cables, in particular by means of a hot air generator.

A first heating phase is intended to bring the sleeve to a given temperature which permits its subsequent shrinkage, this temperature having to be uniform both in the thickness of the sleeve and in its length. For this purpose, while the operator applies the hot-air generator from the outside to the sleeve, he observes, in turn, the two ends of the sleeve, which are in the form shown in FIG. 4.

The applicant has observed during the course of experiments that at the time when the sleeve reaches the aforesaid temperature uniformly throughout its entire thickness, the shape of the inner surface 3 of the sleeve is modified and changes from the hexagonal shape shown in FIG. 4 to a circular shape (FIG. 5) which merges with the aforesaid circle 8 tangent to the flats 7 of the hexagonal shape.

This change in shape results from the relaxation of the expansion stresses in the edge regions 10, which relaxation takes place earlier upon the increase in temperature of the sleeve the greater the intensity of the stresses is. Thus, in the regions of tangency 12 having smaller expansion stresses no relaxation is as yet observed. Furthermore, the shrinkage of the sleeve as a whole has not yet started.

The operator must therefore strive to bring about the passage from the hexagonal shape to the circular shape, and this at both ends of the sleeve. As soon as this change has been observed for the first time at one end, the operator stops heating said end and concentrates the heat from his hot-air generator on the other end so as to cause the change from the hexagonal shape to the circular shape.

The applicant has discovered that when the change from the hexagonal shape to the circular shape has been noted at both ends of the sleeve, the operator can consider the sleeve to be at a uniform temperature over its entire length.

A second phase of heating of the sleeve is intended to cause the shrinkage thereof as a whole over the article to be covered. In order to do this, the operator moves his hot-air generator along the sleeve until the complete shrinkage thereof.

Since the sleeve has been brought to a uniform temperature during the first heating phase, the shrinkage operator takes place faster since there are no longer cold regions within the sleeve. Furthermore, the risk of local burning of the sleeve—due to prolonged heating of certain portions of the sleeve—are minimized, and this both upon the first heating phase and upon the second.

The invention is of particular interest in the event that the thickness of the sleeve to be applied is substantial and therefore makes uniform heating of the sleeve throughout difficult.

As a variant to the description given above, the inner surface 3 of the sleeve may have shapes other than a hexagonal shape and a circular shape. The essential thing is to provide on the inner surface 3, and preferably all around the axis 4 of the sleeve, regions of stronger expansion stresses and regions of weaker expansion stresses. Furthermore, the modification in shape of the inner surface 5 of the sleeve upon the heating must be capable of being readily noted visually.

Although in the above description the sleeve comprises a single layer of a heat-shrinkable material, one can contemplate providing further layers having different physico-chemical or electrical properties, in particular layers which are disposed radially to the outside or inside with respect to said first layer, provided that said further layers do not significantly interfere with the deformation in the hot of the first heat-shrinkable layer or with the viewing of said deformation.

I claim:

1. A heat shrinkable plastic sleeve for application to an article to be covered, said sleeve having a longitudinal axis, an outer surface and an inner surface around said axis, said inner surface having a cross-section which is non-circular in a section taken perpendicularly to said axis and having first portions thereof extending longitudinally of said inner surface and which are spaced from each other circumferentially of said axis to provide intermediate second portions, said first portions being under a stress greater than said intermediate second portions whereby the stress distribution in said inner surface is non-uniform circumferentially of said axis.

2. A heat shrinkable plastic sleeve as set forth in claim 1, wherein said first portions are spaced from said axis farther than said intermediate second portions are spaced therefrom.

3. A heat shrinkable plastic sleeve as set forth in claim 1, wherein the stress increases in accordance with a gradient from said intermediate second portions to centrally of each said first portion.

4. A heat shrinkable plastic sleeve as set forth in claim 1, wherein said cross-section of said inner surface is polygonal and said second portions are flat surfaces of the polygon.

5. A heat shrinkable plastic sleeve as set forth in claim 1, wherein said sleeve comprises an inner layer and an outer layer of heat-shrinkable material, said inner surface being the inner surface of said inner layer and said outer surface being the outer surface of said outer layer.

6. A heat shrinkable plastic sleeve as set forth in claim 1, wherein the cross-section of said outer surface in a section taken perpendicular to said axis is substantially circular.

7. A method for manufacturing a heat-shrinkable sleeve comprising:
   forming a sleeve from a material which, after stretching, is shrinkable by heat, said sleeve having a longitudinal axis and an inner surface and an outer surface around said axis;
   heating said sleeve;
   expanding said inner surface radially of said axis but non-uniformly in the direction circumferentially of said axis to provide a plurality of longitudinally extending, circumferentially spaced portions which are farther from said axis than other portions of said inner surface; and
   while maintaining said inner surface of said sleeve so-expanded, cooling said sleeve to retain the expanded shape of said inner surface after it has cooled.

8. A method as set forth in claim 7 wherein said inner surface is circular in cross-section before it is expanded and is expanded into a polygonal shape in cross-section.

9. A method as set forth in claim 7 wherein all portions of said inner surface are expanded radially after heating with said plurality of portions being expanded by an amount greater than said other portions.

10. A method as set forth in claim 7 wherein said sleeve is formed with an inner surface of circular cross-section prior to heating and without a circumferential stress gradient.

* * * * *